United States Patent [19]

Kono et al.

[11] 4,352,923

[45] Oct. 5, 1982

[54] PROCESS FOR POLYMERIZING FORMALDEHYDE

[75] Inventors: Hisashi Kono; Kenji Terai; Masaki Hisadomi; Katumi Uemura; Sumio Ohta; Yoshiichi Yamamoto, all of Ube, Japan

[73] Assignee: Ube Industries, Ltd., Japan

[21] Appl. No.: 204,353

[22] Filed: Nov. 5, 1980

[30] Foreign Application Priority Data

Nov. 6, 1979 [JP] Japan ................ 54-142828
Jun. 20, 1980 [JP] Japan ................ 55-82866

[51] Int. Cl.$^3$ ................ C08G 2/06; C08G 6/00
[52] U.S. Cl. ................ 528/233; 528/230; 528/235; 528/236; 528/270
[58] Field of Search ........... 528/233, 235, 236, 270, 528/230; 260/33.2 R

[56] References Cited

U.S. PATENT DOCUMENTS

| | | | |
|---|---|---|---|
| 2,734,889 | 2/1956 | Starr | 528/235 |
| 2,933,475 | 4/1960 | Hoover et al. | 528/230 |
| 3,305,529 | 2/1967 | Reynolds | 528/233 |
| 3,419,530 | 12/1968 | Tiessens et al. | 528/236 |
| 3,457,227 | 7/1969 | Kennedy | 528/270 |
| 3,687,899 | 8/1972 | Ackermann et al. | 528/230 |

FOREIGN PATENT DOCUMENTS 1062607 3/1967 United Kingdom ........... 528/233

Primary Examiner—Ronald W. Griffin
Attorney, Agent, or Firm—Finnegan, Henderson, Farabow, Garrett & Dunner

[57] ABSTRACT

Undesirable deposition of polyoxymethylene onto the inner wall of a polymerization reactor and onto a stirrer, which deposition is observed in the slurry polymerization of formaldehyde carried out in an inert organic liquid medium, can be minimized by carrying out the slurry polymerization in the presence of a polymerization catalyst prepared by bringing a metal chelate compound into contact with polyoxymethylene in an inert organic liquid medium in the presence of formaldehyde. Preferably, the slurry polymerization is carried out in the presence of, in addition to the above-mentioned polymerization catalyst, at least one polyvalent metal salt of an alkylsalicylic acid or of a dialkyl ester of sulfosuccinic acid. It is also preferable to use a tubular closed loop reactor equipped with an impeller wherein gaseous formaldehyde is blown into the reactor in a position located downstream from the impeller, while the catalyst-containing slurry is circulated therethrough.

23 Claims, 1 Drawing Figure

PROCESS FOR POLYMERIZING FORMALDEHYDE

BACKGROUND OF THE INVENTION

(1) Field of the Invention

The present invention relates to a process for the slurry polymerization of formaldehyde. More particularly, it relates to a process for the slurry polymerization of formaldehyde in which an undesirable deposition or build up of polyoxymethylene onto the inner wall of a polymerization reactor and a stirrer is minimized.

(2) Description of the Prior Art

A most serious disadvantage encountered in carrying out the slurry polymerization of formaldehyde in an inert organic liquid medium is that formed polyoxymethylene is deposited onto the inner wall of a polymerization reactor and onto a stirrer and, consequently, continuation of stirring and effective removal of the heat of polymerization become difficult, and it becomes necessary to stop the polymerization reaction frequently and wash the polymerization reactor and stirrer, with the result that it is impossible to conduct the continuous operation stably.

Some proposals have heretofore been made in order to eliminate the above-mentioned disadvantages caused by the deposition of polyoxymethylene. For example, it has been proposed in Japanese Patent Publication No. 10,548/1971 to employ a polymerization vessel fitted with a stirring chain which is rotated to impinge against the inner wall of the polymerization vessel, thereby to peel off the polyoxymethylene deposited thereon. It also has been proposed in Japanese Patent Publication No. 3,261/1972 to blow an inert gas into the polymerization mixture during polymerization to prevent polyoxymethylene from being deposited onto the inner wall of the polymerization vessel or the stirrer.

The above-mentioned proposals are not satisfactory. That is, in the former proposal, it is impossible to uniformly peel off polyoxymethylene adhering to the inner wall of the polymerization vessel, and since the peeled blocks of polyoxymethylene are incorporated in the polymer slurry withdrawn from the polymerization vessel, after-treatments such as the terminal group-stabilizing treatment and the copolymerization are adversely affected by the presence of such peeled blocks of polyoxymethylene. When the latter method is carried out on an industrial scale, a special apparatus must be disposed and used for circulating the inert gas. Furthermore, the yield of the polymer is reduced.

It now has been found that the undesirable deposition of polymer is caused mainly by the fact that polymerization of formaldehyde is induced partially by a free catalyst present on the surface of the inner wall of a reactor and on the surface of a stirrer. Accordingly, in the polymerization of formaldehyde using a homogeneous catalyst, it is difficult to prevent such deposition of polymer.

It also has been proposed in Japanese Laid-open Patent Application No. 35,791/1978 to polymerize formaldehyde in an inert organic liquid medium in the presence of a polymerization catalyst adsorbed on polyoxymethylene. This catalyst adsorbed on polyoxymethylene is prepared by a process wherein a polymerization catalyst such as diethylzinc, tin tetrachloride and boron trifluoride ethyl etherate is brought into contact with polyoxymethylene in an inert organic liquid medium whereby the polymerization catalyst is adsorbed on the polyoxymethylene, and then, the catalyst-adsorbed polyoxymethylene is filtered off from the liquid medium and then heat-treated so that adhesion of the catalyst to the polyoxymethylene is enhanced. However, the above-proposed method is still not satisfactory in that, even when the catalyst is contacted with polyoxymethylene over a long period of time, only a minor quantity of the catalyst can be adsorbed on polyoxymethylene.

SUMMARY OF THE INVENTION

It is therefore a primary object of the present invention to provide a process for the polymerization of formaldehyde, in which the polymerization catalyst used is characterized in that substantially the whole amount of the polymerization catalyst used is strongly adsorbed on polyoxymethylene, and, in which undesirable deposition of polyoxymethylene onto the inner wall of a polymerization reactor or onto a stirrer can be minimized without adversely affecting the polymerization activity of the polymerization catalyst.

Other objects and advantages of the present invention will be apparent from the following description.

In accordance with the present invention, there is provided an improvement in a process for the polymerization of formaldehyde wherein formaldehyde is subjected to slurry polymerization carried out in an inert organic liquid medium in the presence of a polymerization catalyst adsorbed on olyoxymethylene. The improvement resides in the use of a polymerization catalyst comprised of a metal chelate compound adsorbed on a polyoxymethylene, which catalyst is prepared by bringing the metal chelate compound into contact with the polyoxymethylene in an inert organic liquid medium in the presence of formaldehyde.

Preferably, the slurry polymerization of formaldehyde is carried out in the presence of, in addition to the above-mentioned polymerization catalyst, at least one polyvalent metal salt selected from the group consisting of polyvalent metal salts of alkylsalicylic acids and polyvalent metal salts of dialkyl esters of sulfosuccinic acid. It is also preferable that the slurry polymerization of formaldehyde be carried out by using a tubular closed loop reactor equipped with at least one impeller wherein gaseous formaldehyde is blown into the reactor in a position located downstream relative to the impeller, while the slurry of the metal chelate compound adsorbed on polyoxymethylene in an inert organic liquid medium is circulated through the tubular closed loop reactor.

DESCRIPTION OF THE PREFERRED EMBODIMENTS

Figure 1:
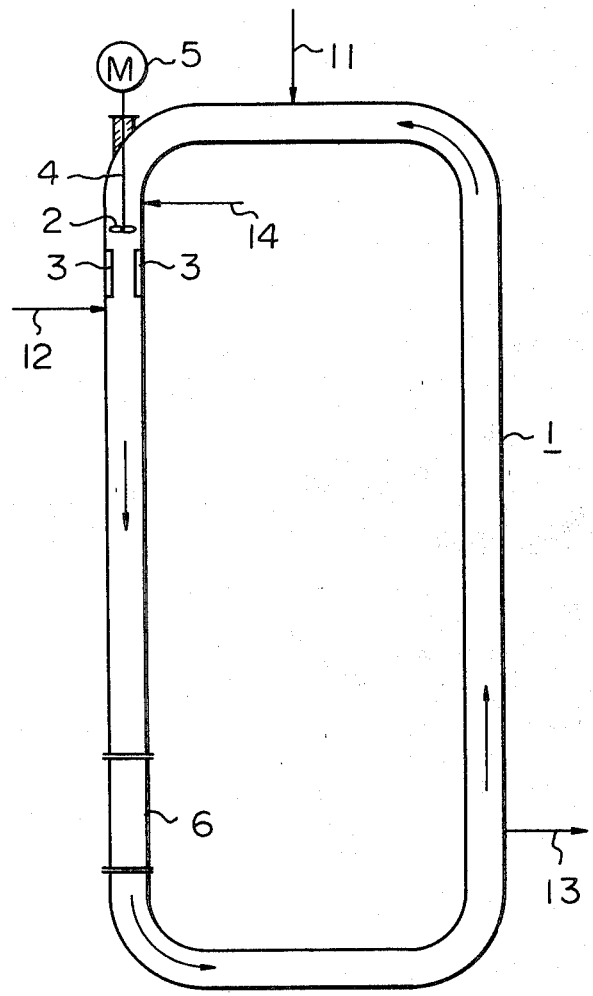
FIG. 1 schematically illustrates a tubular closed loop reactor which is advantageously used in the process of the present invention.

By the term "slurry polymerization" used herein is meant a polymerization wherein formed polyoxymethylene is not dissolved in the inert organic liquid medium, but is dispersed in particle form in the inert organic liquid medium to form a slurry.

As the metal chelate compound that is used in the present invention, there can be mentioned, for example, those which are formed from (a) ligands such as β-diketones, aromatic hydroxyaldehydes and condensation products of these ketones or aldehydes with amines, and (b) metals such as copper, beryllium, magnesium, calcium, zinc, iron, cobalt, nickel, chromium, barium and sodium. Preferable metal chelate compounds are those which are formed from β-diketones and polyvalent metals and which include, for example, bis-(acetylacetonato)copper, bis(3-phenylacetylacetonato)copper and tris(acetylacetonato)cobalt.

The amount of the metal chelate compound used may preferably be in the range of from $1 \times 10^{-7}$ to $2 \times 10^{-4}$ mole in terms of the quantity adsorbed per g of polyoxymethylene.

The polyoxymethylene, with which the metal chelate compound is brought into contact, is not particularly limited. Its molecular weight is also not particularly limited, but, it is preferable that the polyoxymethylene possesses a molecular weight approximately similar to that of polyoxymethylene produced by the process of the present invention. The molecular weight of the polyoxymethylene may usually be such that the intrinsic viscosity, as measured by the hereinafter mentioned procedure, is in the range of from 1 to 6 dl/g. The amount of the polyoxymethylene used may be varied usually in the range of from 1 to 30 g per liter of the inert organic liquid medium.

It is essential that the metal chelate compound be brought into contact with the polyoxymethylene in the presence of formaldehyde. When the metal chelate compound is brought into contact with polyoxymethylene in the absence of formaldehyde, the amount of the metal chelate compound adsorbed is minor even though the contacting time is long. It is preferable that formaldehyde be present in an amount larger than its polymerization equilibrium monomer concentration.

As the inert organic liquid medium that is used in the present invention, there can be mentioned, for example, aromatic hydrocarbons such as benzene and toluene; aliphatic hydrocarbons such as n-pentane, n-hexane and n-heptane; alicyclic hydrocarbons such as cyclohexane and cyclopentane, and halogenated hydrocarbons such as carbon tetrachloride and chlorobenzene.

The contact of the metal chelate compound with the polyoxymethylene may be conducted at a temperature of from 0° to 80° C., preferably from 20° to 60° C., and usually for a period of from 10 minutes to 2 hours.

Substantially the whole amount of the metal chelate compound used can be strongly adsorbed on the polyoxymethylene by bringing the metal chelate compound into contact with the polyoxymethylene in the presence of formaldehyde. The slurry of the metal chelate compound-adsorbed polyoxymethylene in an inert organic liquid medium may be used for polymerization of formaldehyde as it is. Since this slurry substantially contains no free metal chelate compound therein, no deposition of formed polyoxymethylene occurs even if the slurry is used for polymerization of formaldehyde as it is. Alternatively, the metal chelate compound-adsorbed polyoxymethylene may be separated from the inert organic liquid medium and, thereafter, used for polymerization of formaldehyde, although this process is not particularly advantageous over the above-mentioned process using the catalyst slurry as it is.

The polymerization of formaldehyde per se may be carried out in a manner similar to that employed in the conventional polymerization carried out in the presence of a metal chelate compound catalyst, except that the polymerization is carried out in the presence of the above-specified metal chelate compound-adsorbed polyoxymethylene in the present invention.

As the inert organic liquid medium in which the polymerization of formaldehyde is carried out, there can be mentioned those which are hereinbefore explained with respect to adsorption of the metal chelate compound on the polyoxymethylene.

It is preferable that the amount of the metal chelate compound-adsorbed polyoxymethylene is in the range of from $1 \times 10^{-7}$ to $1 \times 10^{-3}$ mole expressed in terms of the amount of the metal chelate compound adsorbed per liter of the inert organic liquid medium.

It is preferable that the water content in formaldehyde to be used in the present invention be not more than 0.5% by weight, more preferably not more than 0.1% by weight.

The procedure by which formaldehyde is fed into a polymerization reactor is not particularly critical. The formaldehyde may be fed into the reactor in the form of either a gas or a solution in an inert organic liquid medium.

The polymerization temperature is not particularly limited provided that the produced polyoxymethylene is insoluble in the inert organic liquid medium used. It is preferable that the polymerization temperature is in the range of from 0° to 80° C., more preferably from 20° to 60° C. The polymerization pressure is also not particularly limited, but, it may usually be in the range of from the atmospheric pressure to 5 Kg/cm² (gauge pressure).

It now has been found that, when the slurry polymerization of formaldehyde is carried out in the presence of, in addition to the above-mentioned metal chelate compound adsorbed polyoxymethylene, at least one polyvalent metal salt selected from polyvalent metal salts of alkylsalicylic acids and polyvalent metal salts of dialkyl esters of sulfosuccinic acid the amount of polyoxymethylene deposited onto the inner wall of the polymerization vessel and the stirrer is additionally reduced.

As the polyvalent metal salt of the alkylsalicylic acid that is used in the present invention, there can be mentioned, for example, salts of polyvalent metals such as magnesium, copper, zinc, cadmium, aluminum, lead, chromium, molybdenum and manganese, with alkylsalicylic acids represented by the formula:

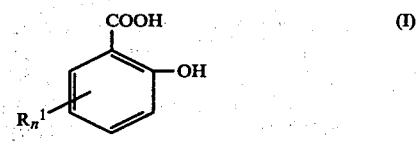

wherein $R^1$ stands for an alkyl group having 3 to 24 carbon atoms and n is an integer of from 1 to 3. Among these salts, a salt of chromium (III) with an alkylsalicylic acid of the formula (I) in which $R^1$ is an alkyl group having 14 to 18 carbon atoms and n is 1 is especially preferred.

As the polyvalent metal salt of the dialkyl ester of sulfosuccinic acid that is used in the present invention, there can be mentioned, for example, salts of polyvalent metals such as calcium, magnesium, copper, zinc, cadmium, aluminum, lead, chromium, molybdenum and manganese, with dialkyl esters of sulfosuccinic acid represented by the formula:

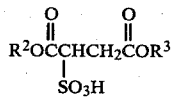

$$\underset{\underset{SO_3H}{|}}{R^2OCCHCH_2COR^3} \quad \text{(II)}$$

wherein $R^2$ and $R^3$ each stand for an alkyl group having 3 to 18 carbon atoms. Among these salts, a calcium salt of di-2-ethylhexyl sulfosuccinate, that is, a compound of the formula (II) in which each of $R^2$ and $R^3$ is an alkyl group having 8 carbon atoms, is especially preferred.

These polyvalent metal salts may be used alone. However, when two or more of these polyvalent metal salts are used in combination, better results are obtained.

It is preferred that the polyvalent metal salt be used in an amount of 0.1 to 50 mg, more preferably 0.5 to 30 mg, per liter of the inert organic liquid medium. When the amount of the polyvalent metal salt used is too small, the amount of polyoxymethylene deposited onto the polymerization reactor and stirrer cannot be reduced to the desired extent. Even if the amount of the polyvalent metal salt used is larger than the above-mentioned upper limit, the effect of reducing the deposition of polyoxymethylene onto the polymerization reactor and stirrer is not particularly enhanced and the formed polyoxymethylene tends to discolor.

The polyvalent metal salt may be used in combination with a polymeric electrolyte. As the polymeric electrolyte, there can be mentioned copolymers of unsaturated carboxylic acids or substitution products thereof, such as stearyl methacrylate/methacrylic acid copolymers and β-hydroxyethyl methacrylate/stearyl methacrylate/methacrylic acid copolymers; and homopolymers of organic bases and copolymer of organic bases with unsaturated carboxylic acids or substitution products thereof, such as ethylene-imine polymers, 2-methyl-5-vinylpyridine polymers and 2-methyl-5-vinylpyridine/lauryl methacrylate/stearyl methacrylate copolymers. Among these polymeric electrolytes, there is preferably used a copolymer of 2-methyl-5-vinylpyridine with an alkyl ester of methacrylic acid having 16 to 18 carbon atoms in the alkyl group.

It is preferred that the polymeric electrolyte be used in an amount of 0.5 to 2 parts by weight per part by weight of the polyvalent metal salt.

The time at which the polyvalent metal salt is added to the polymerization reaction system is not particularly critical. The polyvalent metal salt may be added to the inert organic liquid medium either prior to or simultaneously with initiation of the polymerization reaction. Furthermore, the metal salt may be added in an appropriate stage after the polymerization reaction has been initiated.

Furthermore, it now has been found that, if the slurry polymerization of formaldehyde is conducted over a long period of time by using a vessel type polymerization reactor, the amount of polyoxymethylene doposited onto the blades and shaft of a stirrer gradually increases with a lapse of time although the amount of polyoxymethylene deposited onto the inner wall of a polymerization reactor is negligible. If the slurry polymerization of formaldehyde is conducted by using a tubular closed loop reactor equipped with at least one impeller wherein gaseous formaldehyde is blown into the reactor in a position located downstream relative to the impeller, while the slurry of the metal chelate compound adsorbed polyoxymethylene in an inert organic liquid medium is circulated through the tubular closed loop reactor.

The shape of the tubular closed loop reactor equipped with at least one impeller is not particularly limited, and, may be conventional, provided that the reactor has an inlet conduit located downstream relative to the impeller, through which conduit gaseous formaldehyde is introduced into the reactor. As illustrated in FIG. 1, it is preferable that the tubular closed loop reactor 1 is further equipped with flow rectifying plates 3 disposed immediately downstream relative to the impeller 2 in a manner such that the plates are parallel to the flow direction of the slurry. The flow rectifying plates 3 are formed by metal plates projecting perpendicularly from the inner wall of the reactor 1. By the equipment of the flow rectifying plates, the slurry of the metal chelate compound-adsorbed polyoxymethylene in an inert organic liquid medium can be prevented from swirling in the tubular reactor with the result of greatly reducing the deposition of formed polyoxymethylene.

It is convenient that the metal chelate compound adsorbed on the polyoxymethylene is introduced into the tubular closed loop reactor in the form of a slurry in an inert organic liquid medium. The position, in which the slurry of the metal chelate compound-adsorbed polyoxymethylene is introduced into the reactor, is not particularly limited. For example, the slurry inlet conduit can be provided in a position expressed by reference numeral 11 in FIG. 1.

It is preferable that gaseous formaldehyde is blown into the tubular closed loop reactor in a position located downstream relative to the impeller (see reference numeral 12 in FIG. 1). It is more preferable that the inlet of blown gaseous formaldehyde is provided in a position located immediately downstream relative to the impeller and, in the case where the above-mentioned flow rectifying plates are equipped, the inlet of blown gaseous formaldehyde is provided in a position located immediately downstream relative to the flow rectifying plates.

When the amount of blown gaseous formaldehyde is too large or the time during which the slurry is circulated through the reactor is too short, the amount of gaseous formaldehyde absorbed and polymerized in the slurry is small and, consequently, the impelling force of the impeller is reduced due to the fact that unabsorbed gaseous formaldehyde is caught in the impeller, and polyoxymethylene is deposited onto the upstream portion of the impeller. A suitable amount of blown gaseous formaldehyde and a suitable circulation time can be easily determined by preliminary experiments.

The velocity of the slurry circulating through the tubular closed loop reactor is preferably at least 0.6 m/sec. Furthermore, it is preferable that the slurry is circulated in a turbulent flow range exhibiting a Reynolds number of at least about 50,000, more preferably at least about 100,000. The polyoxymethylene produced by polymerization is withdrawn in the form of a slurry in the inert organic liquid medium through an outlet conduit (reference numeral 13 in FIG. 1) from the reactor.

A continuous polymerization operation can be carried out advantageously by using the above-mentioned tubular closed loop reactor. The small amount of polyoxymethylene deposited onto the inner wall of the tubular reactor after a long period of continuous operation can be completely removed, for example, by circulating polyurethane spheres having fine sands embedded on the surface thereof, through the tubular reactor, while the tubular reactor is externally heated.

The present invention will now be described with reference to the following Examples and Comparative Examples, in which the intrinsic viscosity of a polyoxymethylene was measured at 60° C. on a polymer solution in p-chlorophenol containing 2% by weight of α-pinene. The formaldehyde gas used contained 0.01% by weight of water.

EXAMPLE 1

(1) Preparation of a catalyst slurry

Gaseous formaldehyde was blown into n-heptane having incorporated therein 2.5 g of polyoxymethylene (intrinsic viscosity =5.4 dl/g) per liter of n-heptane. The blowing of gaseous formaldehyde was carried out at a temperature of 25° C. for a period of 40 minutes at a rate of 0.13 g/min·liter of n-heptane. The concentration of formaldehyde in n-heptane reached about 0.63% by weight.

A solution of 1,000 ppm of bis(acetylacetonato)copper in toluene was incorporated into the so obtained n-heptane slurry containing polyoxymethylene and formaldehyde. The amount of bis(acetylacetonato)copper incorporated was $5 \times 10^{-5}$ mole per liter of the n-heptane. The mixture was stirred at 25° C. for 30 minutes. The thus obtained slurry contained 6.6 g of polyoxymethylene per liter of n-heptane and $1 \times 10^{-7}$ mole of bis(acetylacetonato)copper left unadsorbed per liter of n-heptane. Thus, the amount of bis(acetylacetonato)copper adsorbed on polyoxymethylene was $7.6 \times 10^{-6}$ mole per g of the polyoxymethylene. Thereafter, the slurry was diluted with n-heptane to prepare a catalyst slurry containing $5 \times 10^{-6}$ mole of bis(acetylacetonato)copper per liter of n-heptane.

(2) Polymerization of formaldehyde

A two liter volume glass flask equipped with a stirrer, a thermometer and a formaldehyde-blowing nozzle and having a n-heptane solution feed inlet and a polymer slurry discharge outlet was charged with one liter of the above-mentioned catalyst slurry.

Under agitation, the above-mentioned catalyst slurry was continuously fed into the flask at a rate of 50 ml/min. and also gaseous formaldehyde was continuously fed into the flask at a rate of 1 g/min., and the polymerization was continuously conducted at 40° C. for 24 hours while continuously withdrawing the produced polyoxymethylene in the form of a slurry, so that the liquid level was kept constant.

The yield of the polymer was about 100% based on formaldehyde blown into the flask, and the intrinsic viscosity of formed polyoxymethylene was 5.4 dl/g.

After completion of the polymerization reaction, the content in the flask was discharged, and the weight of polyoxymethylene deposited onto the inner wall of the flask and the stirrer (hereinafter referred to as "deposition amount") was measured. The deposition amount was 1.3 g.

COMPARATIVE EXAMPLE 1

Following the same procedure as described in Example 1, a catalyst slurry was prepared and formaldehyde was polymerized using the catalyst slurry, except that bis(acetylacetonato)copper was brought into contact with polyoxymethylene in the absence of formaldehyde in the step of preparing the catalyst slurry. The amount of bis(acetylacetonato)copper adsorbed was $0.1 \times 10^{-6}$ mole per g of the polyoxymethylene.

When 6 hours had passed from the start of the polymerization reaction, rotation of the stirrer became impossible because of extremely increased deposition of polyoxymethylene onto the inner wall of the flask and the stirrer.

The intrinsic viscosity of formed polyoxymethylene was 5.1 dl/g and the deposition amount was 40.1 g.

EXAMPLE 2

Following the same procedure as described in Example 1, a catalyst slurry was prepared and formaldehyde was polymerized using the catalyst slurry, except that $5 \times 10^{-5}$ mole/l of bis(3-phenylacetylacetonato)copper instead of bis(acetylacetonato)copper was dissolved in n-heptane in the step of preparing the catalyst slurry. The amount of bis(3-phenylacetylacetonato)copper adsorbed was $7.3 \times 10^{-6}$ mole per g of polyoxymethylene.

The intrinsic viscosity of formed polyoxymethylene was 4.7 dl/g and the deposition amount was 1.5 g

COMPARATIVE EXAMPLE 2

Following the same procedure as described in Example 2, a catalyst slurry was prepared and formaldehyde was polymerized using the catalyst slurry, except that bis(3-phenylacetylacetonato)copper was brought into contact with polyoxymethylene in the absence of formaldehyde in the step of preparing the catalyst slurry. The amount of bis(3-phenylacetylacetonato)copper adsorbed was $0.2 \times 10^{-6}$ mole per g of the polyoxymethylene.

When 5.5 hours had passed from the start of the reaction, stirring became impossible because of extremely increased deposition of formed polyoxymethylene onto the inner wall of the flask and the stirrer.

The intrinsic viscosity of formed polyoxymethylene was 4.6 dl/g and the deposition amount was 41.0 g.

EXAMPLE 3

Following the same procedure as described in Example 1, formaldehyde was polymerized except that a two liter volume stainless steel vessel was used as a polymerization reactor instead of the glass flask.

The intrinsic viscosity of formed polyoxymethylene was 5.3 dl/g and the deposition amount was 1.5 g.

EXAMPLE 4

Following the same procedure as described in Example 1, a catalyst slurry was prepared and formaldehyde was polymerized using the catalyst slurry except that the catalyst slurry was prepared by incorporating a polyvalent metal salt solution having the following composition into the same catalyst slurry as used in Example 1. The amount of the polyvalent metal salt solution incorporated was 3 mg per liter of n-heptane. The polyvalent metal salt solution used was comprised of:

(a) 20% by weight of a chromium (III) salt (hereinafter referred to as "salt A" for brevity) of an alkylsalicylic acid represented by the hereinbefore-mentioned formula (I) wherein $R^1$ is an alkyl group having 14 to 18 carbon atoms and n is 1, (b) 10% by weight of a calcium salt of a dialkyl ester of sulfosuccinic acid represented by the hereinbefore-mentioned formula (II) wherein both of $R^2$ and $R^3$ are 2-ethylhexyl groups, (c) 45% by weight of a 2-methyl-5-vinyl pyridine/alkyl ester of methacrylic acid (the alkyl group having 17 carbon atoms) copolymer, and (d) 25% by weight of xylene.

The yield of formed polyoxymethylene was about 100%, the intrinsic viscosity of the polyoxymethylene was 5.5 dl/g and the deposition amount was 0.15 g.

REFERENCE EXAMPLE 1

Bis(acetylacetonato)copper and the same polyvalent metal salt solution as used in Example 4 were incorporated into n-heptane. The amounts of the bis(acetylacetonato)copper and the polyvalent metal salt solution were $5 \times 10^{-6}$ mole and 3 mg, respectively, per liter of n-heptane.

Following the same procedure as described in Example 1, formaldehyde was polymerized except that the above-mentioned solution in n-heptane was used instead of the catalyst slurry.

The intrinsic viscosity of formed polyoxymethylene was 5.5 dl/g and the deposition amount was 1.8 g.

EXAMPLE 5

Following the same procedure as described in Example 2, a catalyst slurry was prepared and formaldehyde was polymerized using the catalyst slurry, except that the catalyst slurry was prepared by incorporating the same polyvalent metal salt solution as used in Example 4, into the same catalyst slurry as used in Example 2. The amount of the polyvalent metal salt solution incorporated was 3 mg per liter of n-heptane.

The intrinsic viscosity of formed polyoxymethylene was 4.7 dl/g and the deposition amount was 0.23 g.

EXAMPLE 6

Following the same procedure as described in Example 4, a catalyst slurry was prepared and formaldehyde was polymerized using the catalyst slurry, except that the same salt A as described in Example 4 was incorporated in n-heptane in an amount of 3 mg per liter of n-heptane instead of the polyvalent metal salt solution.

The intrinsic viscosity of formed polyoxymethylene was 5.7 dl/g and the deposition amount was 0.20 g.

EXAMPLE 7

(1) Preparation of catalyst slurry

Gaseous formaldehyde was blown into n-heptane having incorporated therein 6.3 g of polyoxymethylene (intrinsic viscosity =5.4 dl/g) per liter of n-heptane. The blowing of gaseous formaldehyde was carried out at a temperature of 25° C. for a period of 40 minutes at a rate of 0.13 g/min.liter of n-heptane. The concentration of formaldehyde in n-heptane reached about 0.63% by weight.

A solution of 1,000 ppm of bis(acetylacetonato)copper in toluene was incorporated into the so obtained n-heptane slurry containing polyoxymethylene and formaldehyde. The amount of the bis(acetylacetonato)copper incorporated was $5 \times 10^{-5}$ mole per liter of the n-heptane. The mixture was stirred at 25° C. for 30 minutes. The thus obtained slurry contained 10.5 g of polyoxymethylene per liter of n-heptane and $2.5 \times 10^{-7}$ mole of bis(acetylacetonato)copper left unadsorbed per liter of n-heptane. Thus, the amount of bis(acetylacetonato)copper adsorbed on polyoxymethylene was $4.7 \times 10^{-6}$ mole per g of the polyoxymethylene. Thereafter, the slurry was diluted with n-heptane to prepare a catalyst slurry containing $5 \times 10^{-6}$ mole of bis(acetylacetonato)copper per liter of n-heptane.

(2) Polymerization of formaldehyde

An eight liter volume tubular closed loop reactor made of stainless steel and having an entire tube length of 408 cm and a tube inner diameter of 5 cm, which had a structure similar to that illustrated in FIG. 1, was used. Four rectifying plates 3 were provided in the tubular reactor at an immediate downstream from a four blade impeller 2. Eight liters of the above-mentioned catalyst slurry was introduced into the tubular reactor through an inlet conduit 11. The four blade impeller 2 equipped on a driving shaft 4 was rotated by a motor 5 so that the catalyst slurry circulated within the tubular closed loop reactor at a velocity of 1.3 m/sec.

While the catalyst slurry was circulated in the tubular closed loop reactor at the above-mentioned velocity, another part of the catalyst slurry was continuously fed into the reactor at a rate of 6 liters/hour through the inlet conduit 11 and also gaseous formaldehyde was continuously fed into the reactor at a rate of 120 g/hour through an inlet conduit 12. Furthermore, the produced polyoxymethylene was continuously withdrawn in the form of a slurry through an outlet conduit 13. This continuous polymerization was conducted at 40° C. for 100 hours. The Reynolds number at the steady state was $1.3 \times 10^5$.

The yield of formed polyoxymethylene was about 100% and the intrinsic viscosity of the polyoxymethylene was 5.1 dl/g.

After completion of the polymerization reaction, the content in the tubular reactor was discharged, and the weight of polyoxymethylene deposited onto the inner wall of a tube 6 having a length of 30 cm, which tube was a part of the tubular reactor, and onto the four blades 2 and shaft 4 of the impeller was measured. The deposition amount on the inner wall of the tube 6 was 4.7 g and the deposition amount on the impeller (the four blades plus the shaft) was 0.7 g.

For comparison purposes, the above-mentioned procedure for polymerization of formaldehyde was repeated wherein gaseous formaldehyde was introduced into the tubular reactor not through the inlet conduit 12 but through the inlet conduit 14.

When 25 hours had passed from the start of the blowing of formaldehyde, circulation of the reaction mixture became impossible because of increased deposition of formed polyoxymethylene on the impeller 2. The deposition amount on the inner wall of the tube 6 was small, i.e., 1.2 g but the deposition amount on the impeller was 5.1 g.

EXAMPLE 8

Following the same procedure as described in Example 7, a catalyst slurry was prepared and formaldehyde was polymerized using the catalyst, except that $5 \times 10^{-5}$ mole of bis(3-phenylacetylacetonato)copper instead of bis(acetylacetonato)copper was dissolved in n-heptane in the step of preparing the catalyst slurry. The amount of bis(3-phenylacetylacetonato)copper adsorbed was $4.6 \times 10^{-6}$ mole per g of polyoxymethylene.

The intrinsic viscosity of formed polyoxymethylene was 4.8 dl/g. The deposition amount on the inner wall of the tube was 5.6 g and the deposition amount on the impeller was 0.8 g.

COMPARATIVE EXAMPLE 3

Following the same procedure as described in Example 7, formaldehyde was polymerized except that a solution of $5\times 10^{-6}$ mole of bis(acetylacetonato)copper in n-heptane was used instead of the catalyst slurry.

When 6.5 hours had passed from the start of the blowing of formaldehyde, circulation of the reaction mixture became impossible because of increased deposition of formed polyoxymethylene on the impeller 2. The deposition amount on the inner wall of the tube 6 was 36.7 g and the deposition amount on the impeller was 5.3 g.

We claim:

1. In a process for polymerizing formaldehyde wherein formaldehyde is subjected to slurry polymerization carried out in an inert organic liquid medium in the presence of a polymerization catalyst adsorbed on polyoxymethylene, the improvement comprising using a polymerization catalyst comprised of a metal chelate compound adsorbed on a polyoxymethylene, said polymerization catalyst being prepared by bringing the metal chelate compound into contact with the polyoxymethylene in an inert organic liquid medium in the presence of formaldehyde.

2. A process according to claim 1, wherein the metal chelate compound is at least one compound selected from the group consisting of metal chelate compounds formed from (a) ligands selected from β-diketones, aromatic hydroxyaldehydes, or condensation products of these ketones or aldehydes with amines, and (b) metals selected from copper, beryllium, magnesium, calcium, zinc, iron, cobalt, nickel, chromium, barium and sodium.

3. A process according to claim 1 or 2, wherein the amount of the metal chelate compound used is in the range of from $1\times 10^{-7}$ to $2\times 10^{-4}$ mole in terms of the quantity adsorbed per g of polyoxymethylene.

4. A process according to claim 1, wherein the amount of the polyoxymethylene, with which the metal chelate compound is brought into contact, is in the range of from 1 to 30 g per liter of the inert organic liquid medium.

5. A process according to claim 1, wherein the amount of formaldehyde present in the inert organic liquid medium, in which the metal chelate compound is brought into contact with the polyoxymethylene, is larger than the polymerization equilibrium monomer concentration of formaldehyde.

6. A process according to claim 1, wherein the contact of the metal chelate compound with the polyoxymethylene is carried out at a temperature of from 0° to 80° C. for a period of from 10 minutes to 2 hours.

7. A process according to claim 1, wherein the slurry polymerization of formaldehyde is carried out in the presence of, in addition to the metal chelate compound-adsorbed polyoxymethylene, at least one polyvalent metal salt selected from the group consisting of polyvalent metal salts of alkylsalicylic acids and polyvalent metal salts of dialkyl esters of sulfosuccinic acid.

8. A process according to claim 7, wherein the alkylsalicylic acids are represented by the formula (I):

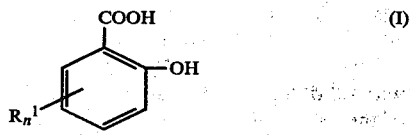

wherein $R^1$ stands for an alkyl group having 3 to 24 carbon atoms and n is an integer of from 1 to 3.

9. A process according to claim 8, wherein the polyvalent metal salt of an alkylsalicylic acid is a salt of chromium (III) with an alkylsalicylic acid of the formula (I) in which $R^1$ is an alkyl group having 14 to 18 carbon atoms and n is 1.

10. A process according to claim 7, wherein the dialkyl esters of sulfosuccinic acid are represented by the formula (II):

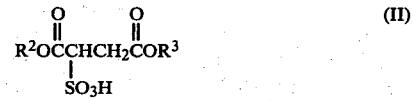

wherein $R^2$ and $R^3$ each stand for an alkyl group having 3 to 18 carbon atoms.

11. A process according to claim 10, wherein the polyvalent metal salt of a dialkyl ester of sulfosuccinic acid is calcium di-2-ethylhexyl sulfosuccinate.

12. A process according to any one of claims 7, 8 or 10, wherein the at least two polyvalent metal salts are used.

13. A process according to any one of claims 7, 8 or 10, wherein the amount of the polyvalent metal salt is in the range of from 0.1 to 50 mg per liter of the inert organic liquid medium.

14. A process according to any one of claims 7, 8 or 10, wherein the amount of the polyvalent metal salt is in the range of from 0.5 to 30 mg per liter of the inert organic liquid medium.

15. A process according to any one of claims 7, 8 or 10, wherein the polyvalent metal salt is used in combination with 0.5 to 2 parts by weight of a polymeric electrolyte per part by weight of the polyvalent metal salt.

16. A process according to claim 1 or 7, wherein the formaldehyde to be polymerized contains not more than 0.5% by weight of water.

17. A process according to claim 1 or 7, wherein the inert organic liquid medium is a liquid hydrocarbon which is incapable of dissolving formed polyoxymethylene therein at the polymerization temperature employed.

18. A process according to claim 1 or 7, wherein the slurry polymerization of formaldehyde is carried out by using a tubular closed loop reactor equipped with at least one impeller wherein gaseous formaldehyde is blown into the reactor in a position located downstream relative to the impeller, while the slurry of the metal chelate compound-adsorbed polyoxymethylene in the inert organic liquid medium is circulated through the reactor.

19. A process according to claim 18, wherein the tubular closed loop reactor is further equipped with flow rectifying plates disposed immediately downstream relative to the impeller in a manner such that the flow rectifying plates are parallel to the flow direction of the slurry.

20. A process according to claim 18, wherein the velocity of the slurry circulated through the reactor is at least 0.6 m/sec.

21. A process according to claim 18, wherein the slurry circulated through the reactor exhibits a Reynolds number of at least about 50,000.

22. A process according to claim 1 or 7, wherein the slurry polymerization is carried out at a temperature of from 0° to 80° C.

23. A process according to claim 1 or 7, wherein the slurry polymerization is carried out under a pressure of from atmospheric pressure to 5 kg/cm².

* * * * *